United States Patent Office 3,240,787
Patented Mar. 15, 1966

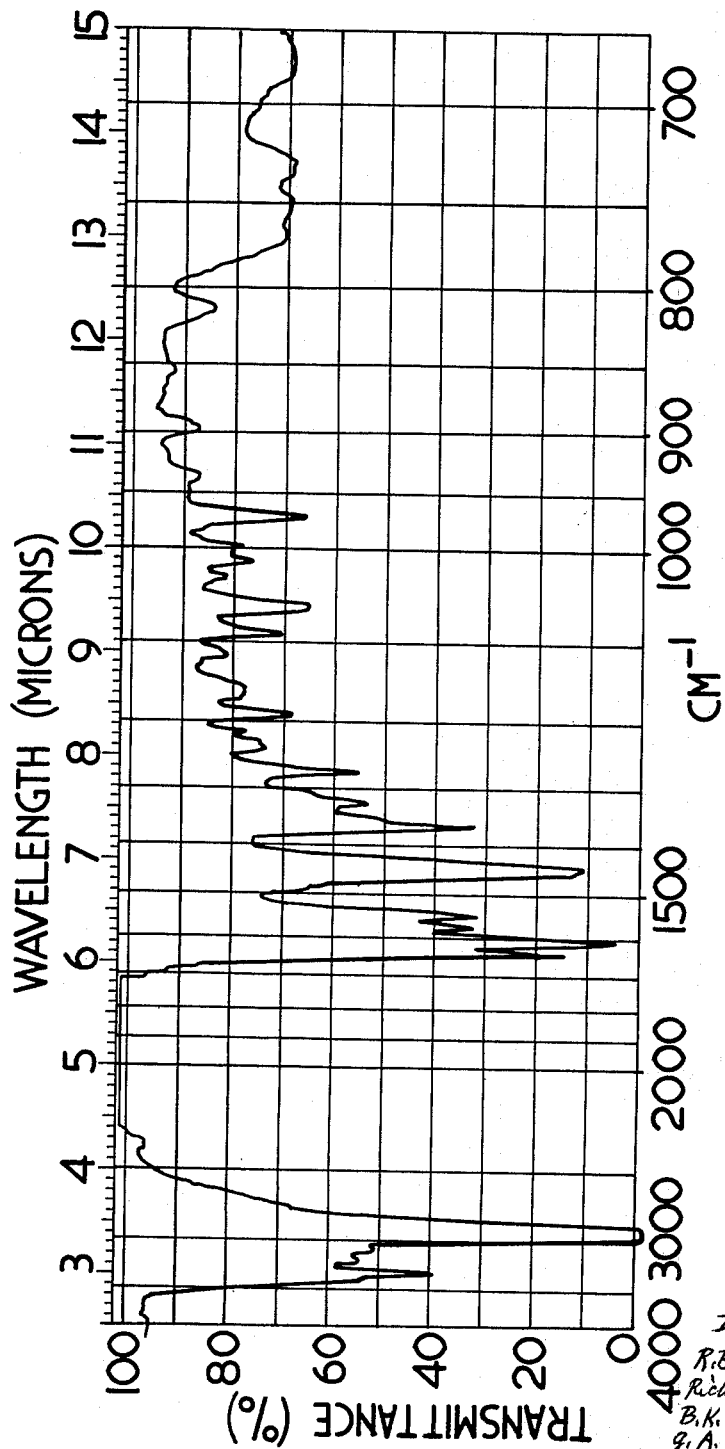

3,240,787
ALPHA - HYDROXYMETHYL - N - [OMEGA - HY-
DROXAMIC - ACID - ETHYLENE - CARBONYL-
AMINO - METHYLENE - CARBONYL] - PYRROLI-
DINE AND PROCESS FOR ITS PRODUCTION
Ranjeet Bhagwan Singh, c/o The Institute for Medical Research, Kuala Lumpur, Malaya; Richard Green, 92 Florence Road, Nedlands, Perth, Western Australia, Australia; Brendan Kevin Kelly, c/o University of London, 44 Gordon Square, London W.C.1, England; George Arthur Miller, c/o The Microbiological Research Establishment, Porton, Salisbury, Wiltshire, England; and James Joseph Gordon, 5 Somerset Road, Salisbury, Wiltshire, England
Filed Jan. 21, 1963, Ser. No. 252,673
Claims priority, application Great Britain, Jan. 23, 1962, 2,499/62
5 Claims. (Cl. 260—326.3)

This invention relates to antibiotics and comprises a new antibiotic substance named Actinonin which is a compound of molecular formula $C_{19}H_{35}O_5N_3$ and of structural formula

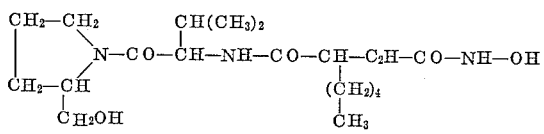

Available evidence proves that the configuration of the asymmetric carbon atom in the prolinol ring is L, that of the carbon atom to which the iso-propyl group is attached is also L, while that of the carbon atom to which the n-amyl group is attached is D.

Actinonin crystallises from ethanol/ether or dimethyl collosolve as colourless needles melting at 148–149° C. It has an $(\alpha)_D^{20}$ of −53.9° in ethanol and −65.0° in water. It is remarkably stable to alkali and can be recovered substantially unchanged from 10 N caustic soda solution. Non-toxic metal salts of actinonin, e.g. alkali metal salts are prepared by dissolving the subsance in one equivalent of the appropriate base, e.g., sodium hydroxide and evaporating the solution to dryness. Actinonin is unaffected by cold dilute acid but is hydrolysed by 50% hydrochloric acid at 100° C. It has a solubility in water of the order of 1 gm./100 ml. and greater solubility in certain organic solvents, e.g., ethyl acetate, ethanol, particularly n-butanol and pyridine, but lower solubility in acetone. The infra-red spectrum of Actinonin indicates OH and NH absorption at 3300–3000 cm.$^{-1}$ and complex carbonyl absorption at 1660–1600 cm.$^{-1}$, as shown in the accompanying drawing.

Actinonin is active mainly, but not exclusively, against gram positive organisms as shown in the following table.

| Organism: | Minimum concentration of Actinonin required to prevent growth (μg./ml.) |
|---|---|
| Cicrococcus ureae | 20 |
| B. subtilis 7198 | 20 |
| B. subtilis 3610 | 40 |
| Sarcina | 40 |
| Myco amegnatis | 40 |
| B.C.G. | 60 |
| Klebsiella pneumoniae 0/10 | 60 |
| B. subtilis G.B.S. | 60 |
| Corynebacterium xerosis 0/2 | 60 |
| Myco Phlei 0/17 A.F. | 60 |
| Myco phlei 0/14 | 60 |
| S. aureus G | 100 |
| S. albus 7292 | 100 |
| B. subtilis 0/1 | 100 |
| B. subtilis 6346 | 100 |
| B. anthracis 0/15 | 100 |
| S. aureus Paler | 100 |
| Micrococcus lysodeiktious | 100 |
| Salmonella enteritidis | 100 |
| S. typhosa | 100 |
| S. typhimurium | 100 |
| Sterptococcus agalactiae NIRD | 100 |
| Str. agalactiae 8182 | 100 |
| Str. lactis | 100 |
| Str. pyogenes 0/8 | 100 |

It also shows some inhibition of the phases of a number of strains of *S. aureus* at concentrations down to 0.25 μg./ml. It has no apparent toxicity for mice at very high dosages.

Actinonin is a metabolic product of a species of Actinomyces and in accordance with this invention is produced during the culture of Streptomyces strain cutter C/2 (NCIB 8845) (ATCC No. 14,903) in a suitable nutrient medium. The Streptomyces strain employed in the fermentation procedure of the present invention is maintained as a stock culture on sterile soil. Several samples of the soil are preferably incubated in parallel on agar slopes in two stages, e.g., from the 1 oz. to the 20 oz. scale, to produce sufficient micro-organism for culture in aspirators of say 10 litre capacity. The production of several independent cultures is desirable so that a check can be made of the behaviour of the micro-organism; each of these 10 litre scale cultures is assayed for antibiotic activity and the one with the best titre is preferably used as inoculum for fermentation in vessels of the order of 100 gallon capacity. In common with other Actinomyces the strain employed according to this invention requires careful selection to obtain suitable titres of antibiotic activity in the final culture, and it is highly recommended that the master stock culture on sterile soil be treated as the working culture for each batch process by a procedure of the kind described above.

It will be appreciated that the nutrient medium for the micro-organism must contain a suitable source of nitrogen and a carbohydrate. Convenient sources of nitrogen are, for example, Bacto yeast (Dif. Co.), cornstep liquor, dried autolysed yeast (Distillers Co. Ltd.), fish meal, Maggi bouillon powder, meat meal, meat extract, and soya bean meal. Sufficient of these materials is employed to contribute a nitrogen content in the medium, of, for example, 800–900 mg. N per litre. They may be used singly or in combination. Of these sources of nitrogen Bacto-yeast and dried autolysed yeast are more favoured, with Maggi bouillon powder and fish meal next in order of preference. Supplements of ammonium acetate, ammonium lactate, and dibasic ammonium phosphate to provide proportions up to about half the total nitrogen may also be added to the medium, a supplement of ammonium acetate equivalent to about 200 mg. N per litre of medium being advantageous.

Starch is highly recommended as the carbohydrate of the medium being employed, for example, at a concentration of from 1.0–2.5%. Glucose, sucrose and lactose are alternative sources of carbon, glucose being preferred of these.

The temperature at which the fermentation is conducted may vary from 20° to 40° C. For example, temperatures of 24, 30, 32 and 34° give comparable results, a temperature of 32° being very convenient and giving a good rate of growth to the organism.

The presence of oxygen is essential to the proper growth of the organism and customary stirring and aeration methods should be employed during fermentation. With fermentations of 300 litre capacity, stirring at the rate of from 200–250 r.p.m. and aeration of about 6 cu. ft. per min. give very good results. Non-toxic antifoaming agents may be added to the medium if needed, e.g., a sterile mixture of silicone "A" and Shell "Risella" oil.

The pH of the medium usually increases during fermentation and it is convenient to adjust the pH of the initial culture to a value of little below neutrality, e.g., about 6.8.

Antibiotic activity is at a maximum after a time of between 48–72 hours' fermentation.

A convenient assay method employed for estimating antibiotic activity for the purposes of this invention is an agar diffusion technique (Brownlee et al., J. Gen. Microbiol., 2, 40; Humphrey and Lightbown, ibid., 7, 129), an aqueous solution of pure crystalline Actinonin being employed as standard. A straight line relationship with a reproducible slope is consistently found between log concentration and zone diameter. The unit of activity is the activity due to 1 microgramme of pure Actinonin.

Activity is found to predominate in the culture fluid and, to recover the antibiotic, the mycelium is removed from the medium by filtration or centrifugation as the first step. In view of its food solubility in the water-immiscible solvents referred to above and is stability to alkali one very convenient method of extraction of Actinonin from the culture fluid is as follows. The fluid is first extracted with the solvent, n-butanol being especially preferred, and the Actinonin is thereafter purified by a series of transfers between aqueous alkali and a suitable immiscible organic solvent, e.g., chloroform, extractions with organic solvents being carried out at pH values on the acid side of neutrality. Evaporations under reduced pressure of organic solvent extracts will be extensively practised to reduce the volumes of material being handled, and in a latter stage of the procedure the antibiotic will be precipitated from a concentrate in the organic solvent by treatment with a comparatively large volume of an organic solvent in which it is insoluble, e.g., ether. Continuous countercurrent extraction methods may be employed.

The invention will now be further described with the aid of a detailed example.

*Example*

(a) *Production of antibiotic.*—A master stock culture of Streptomyces strain cutter C/2 (NCIB 8845) (ATCC No. 14,903) is seeded onto a 1 oz. Le Page agar slope culture medium of the following composition:

| | Percent |
|---|---|
| Bacto yeast | 1.0 |
| Glucose | 1.0 |
| Sodium chloride | 0.5 |
| Ferrous sulphate (7H$_2$O) | 0.001 |
| Magnesium sulphate (7H$_2$O) | 0.025 |
| Agar (Davis, N.Z.) | 2.0 |
| Distilled water | 100 |

Adjusted to give pH 6.8 after sterilisation.

After incubation for 7 days at 37° C. the culture is used to inoculate a 20 oz. agar slope having the composition set out above. After incubation under similar conditions as for the 1 oz. scale the culture is washed off the agar slope and used to inoculate a 10 litre aspirator containing 8 litres of Le Page medium having the composition set out above with the exception of the agar and containing in addition 1200 p.p.m. silicone "A" and 1200 p.p.m. triamyl citrate to control foaming. The above procedure is carried out in parallel with a number of seedings from the master stock to produce a number of 10 litre scale cultures. After incubation for 48 hours at 24° C. with stirring at the rate of 300 r.p.m. and aeration of 12 litres per min. the aspirators are assayed for activity, that with the highest titre being employed for the next stage. After some further time of incubation, bringing the total time up to about 72 hours, the selected culture is inoculated into a 100 gallon jacketed stainless steel fermenter containing 70 gallons of fermentation medium of the following composition:

| | | |
|---|---|---|
| Dried autolysed yeast to give | mg. N/l | 840 |
| Ammonium acetate to give | mg. N/l | 200 |
| Starch | percent | 1.0 |
| Sodium chloride | do | 0.5 |
| Ferrous sulphate (7H$_2$O) | do | 0.001 |
| Magnesium sulphate (7H$_2$O) | do | 0.025 |
| Silicone "A" | p.p.m | 1200 |
| Triamyl citrate | p.p.m | 1200 |
| Water to | percent | 100 | pH adjusted before sterilisation to give pH 6.8 after sterilisation.

During fermentation a sterile mixture of silicone "A" and Shell "Risella" oil may be added where necessary to assist in controlling foaming. Fermentation is carried out at 32° C. with stirring at 250 r.p.m. and aeration of 6 cu. ft. per min. until maximum antibiotic activity is shown, usually a period of 48 hours being sufficient.

(b) *Isolation of antibiotic.*—The culture (approximately 300 l.) is adjusted to pH 5 with concentrated HCl and filtered to remove the mycelium, and the filtrate extracted with from ¼ to ⅓ of its volume of n-butanol. For this stage, a continuous mixing and separation procedure based on the use of the Alfa-Laval centrifuge, as described by Gordon et al., J. Gen. Microbiol., 1, 187 (1947), is used. The bowl is assembled for separation but with the clarifying disc placed at the bottom of the intermediate distribution discs, the filtrate and butanol are caused to flow into the bowl at rates of approximately 120 l./hr. and 30–40 l./hr., respectively, are first rapidly emulsified and then separated.

The butanol extract is led into a Van Heyningen still (Brit. J. Exp. Path., 30, 302) for continuous distillation to approximately 2–5 l. volume. The final concentrate is treated with its own volume of petroleum ether (B.P. 80°–100°), and the mixture centrifuged. The clear supernatant is then extracted with half its volume of N aqueous sodium hydroxide. The alkaline extract is adjusted to pH 6.5 with a few drops of 85% phosphoric acid, followed by dilute hydrochloric acid, saturated with sodium chloride and extracted with its own volume of chloroform. The chloroform extract is re-extracted with one tenth its volume of N aqueous sodium hydroxide and then with one twentieth of its volume of water. The combined aqueous extracts are adjusted to pH 6.5 with phosphoric acid and dilute hydrochloric acid, saturated with sodium chloride and extracted with an equal volume of chloroform. The volume of this second chloroform extract is usually from 300 to 600 ml.

The chloroform concentrate is extracted with its own volume of 0.02 N aqueous sodium hydroxide in four portions during which centrifuging is sometimes necessary to break the emulsion formed. The spent chloroform is assayed, and if still over 100 μ/ml., its re-extracted with 0.02 N aqueous sodium hydroxide. The alkali extracts are brought to pH 6.5, saturated with sodium chloride and extracted with an equal volume of chloroform. The combined chloroform extract is concentrated to low bulk (approximately 50–100 ml.) and treated with at least four times its volume of ether at 0°. The white or yellow amorphous solid which precipitates is filtered and dried over phosphoric anhydride in vacuo. This material is approximately 60% pure. It is dissolved in 100–200 ml. ethanol, and the solution boiled with active carbon (2–3 gm.) for 5 min., and filtered. The filtrate is concentrated by evaporation at a pressure of 40 mm. to a syrupy liquid which is then treated with a large volume of ether, and is then left at 0° The white precipitate obtained has M.P. 147–149° (uncorr.) and is readily crystallised from a mixture of ethanol and ether of 0° to give fine white needles or colourless rods of substantially pure Actinonin, M.P. 148–149° (uncorr.).

As an alternative to the solvent extraction procedure described above, Actinonin can be recovered from the butanol extract by adsorption on and elution from suitable solid substrates, e.g., strongly basic anion exchange resins of the quaternary ammonium hydroxide type.

In addition to the bacteria mentioned hereinbefore Actinonin is active against *S. aureus* (H), *S. aureus* R1 (penicillinase producer), Pneumococcus (Type 1), *Strep pyo.* CN10, *E. coli* (Type 1), *S. typhi*, and *Sh shigae*. It is also useful as an additive to animal feedstuffs.

We claim:

1. A compound selected from the group consisting of a compound of formula

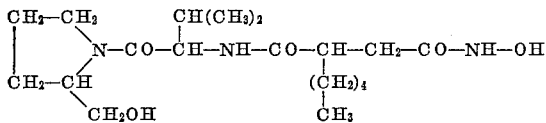

and its alkali metal salts.

2. Process for producing antibiotic material which comprises cultivating Streptomyces strain Cutter C/2 (NCIB 8845) (ATCC No. 14903) in a nutrient culture medium therefor until substantial antibiotic activity has developed in the medium.

3. Process for the production of antibiotic material which comprises cultivating Streptomyces strain Cutter C/2 (NCIB 8845) (ATCC No. 14903) in presence of oxygen in a suitable nutrient medium comprising a source of nitrogen selected from the group consisting of Bacto yeast, cornsteep liquor, dried autolysed yeast, fish meal, Maggi bouillon powder, meat meal, meat extract, and soya bean meal, and a supplementary source of nitrogen comprising a suitable ammonium salt, and a carbohydrate selected from the group consisting of starch, glucose, sucrose and lactose, maintaining the culture at a temperature in the range 20–40° C., for a time sufficient to develop substantial antibiotic activity in the culture medium of recovering Actinonin therefrom.

4. Process for the production of antibiotic material which comprises cultivating Streptomyces strain Cutter C/2 (NCIB 8845) (ATCC No. 14903) in presence of oxygen in a suitable nutrient medium comprising a source of nitrogen selected from the group consisting of Bacto yeast, cornsteep liquor, dried autolysed yeast, fish meal, Maggi bouillon powder, meat meal, meat extract, and soya bean meal, to provide 800–900 mg. of nitrogen per litre of medium, and supplementary source of nitrogen comprising an ammonium salt selected from ammonium acetate, ammonium lactate, and dibasic ammonium phosphate to provide about 200 mg. of nitrogen per litre of medium, and a carbohydrate selected from the group consisting of starch, glucose, sucrose, and lactose, the initial pH of the medium being from about 6.8 to about 7.0, maintaining the culture at a temperature in the range 30–34° C. for at least 48 hours, filtering the mycelium and recovering Actinonin from the culture filtrate.

5. Process according to claim 2, in which the antibiotic material is recovered from the culture fluid by a solvent extraction process comprising the steps of n-butanol extraction of said fluid to produce an extract thereof, treatment of said extract with aqueous alkali to produce an alkaline phase containing the antibiotic material, and transference of said antibiotic material from said alkaline phase by extraction thereof with chloroform at acid pH.

References Cited by the Examiner

UNITED STATES PATENTS 3,142,618   7/1964   Nakazawa et al. ____ 195—80 X

FOREIGN PATENTS 712,547   7/1954   Great Britain.
811,757   4/1959   Great Britain.

IRVING MARCUS, *Primary Examiner.*

UNITED STATES PATENT OFFICE
CERTIFICATE OF CORRECTION

Patent No. 3,240,787                                                        March 15, 1966

Ranjeet Bhagwan Singh et al.

It is hereby certified that error appears in the above numbered patent requiring correction and that the said Letters Patent should read as corrected below.

Column 1, line 60, for "Cicrococcus ureae", in italics, read -- *Micrococcus ureae* --, in italics.

Signed and sealed this 4th day of October 1966.

(SEAL)
Attest:

ERNEST W. SWIDER                                        EDWARD J. BRENNER
Attesting Officer                                              Commissioner of Patents